US011200991B2

(12) United States Patent
Leblanc

(10) Patent No.: US 11,200,991 B2
(45) Date of Patent: Dec. 14, 2021

(54) MOLTEN SALT NUCLEAR REACTOR

(71) Applicant: TERRESTRIAL ENERGY INC., Oakville (CA)

(72) Inventor: David Leblanc, Ottawa (CA)

(73) Assignee: TERRESTRIAL ENERGY INC., Oakville (CA)

( * ) Notice: Subject to any disclaimer, the term of this patent is extended or adjusted under 35 U.S.C. 154(b) by 609 days.

(21) Appl. No.: 15/771,742

(22) PCT Filed: Oct. 28, 2016

(86) PCT No.: PCT/CA2016/051255
§ 371 (c)(1),
(2) Date: Apr. 27, 2018

(87) PCT Pub. No.: WO2017/070791
PCT Pub. Date: May 4, 2017

(65) Prior Publication Data
US 2018/0322964 A1    Nov. 8, 2018

Related U.S. Application Data

(60) Provisional application No. 62/248,755, filed on Oct. 30, 2015.

(51) Int. Cl.
*G21C 1/03* (2006.01)
*G21C 1/22* (2006.01)
(Continued)

(52) U.S. Cl.
CPC ............... *G21C 1/22* (2013.01); *G21C 1/03* (2013.01); *G21C 3/24* (2013.01); *G21C 5/123* (2013.01);
(Continued)

(58) Field of Classification Search
CPC ................................ G21C 1/03; G21C 1/22
See application file for complete search history.

(56) References Cited

U.S. PATENT DOCUMENTS 3,018,239 A * 1/1962 Happell ................. G21C 11/06
376/359
3,136,700 A * 6/1964 Poppendiek ............ G21C 1/22
376/354
(Continued)

FOREIGN PATENT DOCUMENTS

| JP | S571991 B2 * | 1/1982 |
| WO | 2013116942 A1 | 8/2013 |
| WO | 2015094450 A1 | 6/2015 |

OTHER PUBLICATIONS

International Patent Application No. PCT/CA2016/051255, International Preliminary Report on Patentability dated May 11, 2018.
(Continued)

*Primary Examiner* — Lily C Garner
(74) *Attorney, Agent, or Firm* — Borden Ladner Gervais LLP; Louis B. Allard

(57) ABSTRACT

A molten salt nuclear reactor a neutron moderator core that has an inner region that defines channels of a first diameter separated by a first pitch and, an outer region that defines channels of a second diameter separated by a second pitch. The first diameter is larger than the second diameter and the first pitch is larger than the second pitch. This configuration allows for an increased capture of neutrons by fertile elements in the outer region. That is, less neutrons are lost to the outside of the core. The configuration is such that the neutron multiplication factor is larger than one in the inner portion and lower than one in the outer portion.

11 Claims, 5 Drawing Sheets

(51) Int. Cl.
    *G21C 5/14*     (2006.01)
    *G21C 3/24*     (2006.01)
    *G21C 5/12*     (2006.01)
    *G21C 5/18*     (2006.01)

(52) U.S. Cl.
    CPC ............... G21C 5/14 (2013.01); G21C 5/18 (2013.01); *Y02E 30/30* (2013.01)

(56) References Cited

U.S. PATENT DOCUMENTS

| | | | |
|---|---|---|---|
| 3,251,745 A * | 5/1966 | Teitel ................. | G21C 1/22 376/174 |
| 10,043,594 B2 * | 8/2018 | Scott .................. | G21C 1/22 |
| 10,056,160 B2 * | 8/2018 | LeBlanc ............. | G21D 3/00 |
| 10,283,223 B2 * | 5/2019 | Hansen ............... | G21C 1/22 |
| 10,510,450 B2 * | 12/2019 | Arafat ................. | G21C 1/12 |
| 10,867,710 B2 * | 12/2020 | Cisneros, Jr. ........ | G21C 11/06 |
| 2009/0279658 A1 | 11/2009 | Leblanc | |
| 2010/0296620 A1 * | 11/2010 | Peterson ............. | G21C 3/30 376/330 |
| 2012/0051481 A1 * | 3/2012 | Shu .................... | G21C 5/02 376/174 |
| 2014/0023172 A1 * | 1/2014 | Leblanc ............... | G21C 1/03 376/360 |
| 2015/0228363 A1 * | 8/2015 | Dewan ................ | G21C 3/06 376/458 |

OTHER PUBLICATIONS

International Patent Application No. PCT/CA2016/051255, International Search Report and Written Opinion dated Jan. 9, 2017.

\* cited by examiner

MOLTEN SALT NUCLEAR REACTOR

FIELD

The present disclosure relates generally to nuclear reactors. More particularly, the present disclosure relates to molten salt nuclear reactors.

BACKGROUND

In the design of the core of nuclear reactors it is desired to make maximum use of all produced neutrons, i.e. to promote neutron absorption into fertile or fissile elements and reduce their loss to parasitic absorption or leakage from the core. Leakage of neutrons from the core (nuclear core section) is particularly problematic as such neutrons can induce damage to surrounding materials, in particular to any vessel containing the nuclear core section of the reactor.

Various methods have been proposed and/or utilized to limit neutron leakage from the cores of nuclear reactors. For example, reflectors made of material having a relatively low cross section for neutron absorption can be placed around the core of the reactor. In some cases this reflector material is also a moderator of neutrons and often the same material as the moderator used in the core itself. For example a layer of water surrounding water-moderated and water-cooled reactors or a layer of graphite surrounding graphite moderated reactors.

In other designs a non-moderating reflector may be employed such as a thick layer of steel which serves a similar function to reflect, back toward the core, at least a fraction of the neutrons that exit the core of the reactor and enter the reflector. Such a reflection is based on a random walk phenomenon and many neutrons will either randomly walk out of the reflector or be absorbed in the reflector before being able to scatter back into the core. Thus, reflectors in general are only partially successful in limiting the loss of neutrons.

Furthermore, the use of reflectors, especially those that are also neutron moderators like graphite or water can have a counter intuitive effect in that in some cases, such reflectors may actually increase leakage from the nuclear core. The reflected neutrons returning to the nuclear fuel-containing core can substantially increase the fission power density in the outer zone of the nuclear core. In the case of moderating reflectors, the reflected neutrons will on average be at a lower energy upon returning to the core and this will typically result in a larger effective neutron cross section for fission. This results in a substantial increase in both fission power density and neutron production rates in the outer zone of the nuclear core. Thus, with a surrounding reflector, neutron losses can actually increase because of the higher flux of neutron in the periphery of the core. In any case it is clear that reflectors alone provide only a partial solution to lowering neutron losses from nuclear cores.

Another known method for reducing neutron losses has been to provide what are termed undermoderated zones or undermoderated blankets. In reactors that use a moderator (for example, light water, heavy water, graphite, beryllium, zirconium hydride), the volume ratio of fuel to moderator can be adjusted within the core to reduce neutron losses.

In such reactors, the central zone of the nuclear core is designed with a ratio of moderator material volume to nuclear fuel volume (both fertile and fissile material) to give the reactivity needed for criticality, i.e. the local reproduction factor of neutrons, $k_{inf}$ is greater than 1.0. In an outer layer of the core, the ratio of moderator material volume to fuel (fissile+fertile) volume is increased. Thus, in this outer zone the moderation of neutrons is not as effective at avoiding the large resonant absorption cross-section of the fertile isotopes (typically U238 or Th232) and local absorption in fertile dominates over fissile absorption. This leads to a local $k_{inf}$ of much less than 1.0 and the region becomes a net absorber of neutrons and neutron leakage can be significantly lowered. Such absorptions in the fertile elements are not viewed as unproductive as they lead to the production of new fissile material that can help sustain the nuclear process and either lower the amount of makeup fuel needed for the reactor or, increase the breeding ratio in the case of breeder designs.

An example of this technique and perhaps the first mention was proposed for use in Molten Salt Reactors using graphite as moderator. The Molten Salt Breeder Reactor (MSBR) design of the late 1960s and 1970s for instance had a central core zone with 12% fuel salt by volume and 88% graphite whereas an outer zone of the reactor core had a higher fuel fraction of 37%. Surrounding this undermoderated zone was a graphite reflector.

Such a technique, while quite effective at converting the unproductive loss of leakage neutrons into productive fertile absorptions suffers drawbacks. Primarily, such an undermoderated zone contains a large amount of fuel to function. For example in this MSBR design, the outer undermoderated blanket contained more fuel than the inner core but only produced 17% of the fission power. This represents a significant penalty in terms of needed starting fuel for the reactor. As well there are thermal hydraulic concerns as the higher salt fraction and reduced power output mean the flow of salt must be slowed significantly in the blanket zone to assure a uniform temperature upon exit relative to salt flowing through the central zone.

A roughly equivalent method would be, instead of changing the fuel to moderator ratio in an outer zone or blanket, to employ fuel with a higher ratio of fertile to fissile elements (i.e. lower enrichment levels). This is not possible in the case of single fluid Molten Salt Reactor designs as all the fissile material and fertile material is the same mixture. As will be understood by the skilled worker, a single fluid Molten Salt Reactor has both fissile elements and fertile elements in the same single fluid circulating in the reactor. It is possible for solid fuel designs but has the drawback of requiring fuel of different enrichments that can lead to complexity and potential issues if the fuel is mistakenly used in the wrong zones.

Therefore, improvements in nuclear reactors are desirable.

SUMMARY

In a first aspect, the present disclosure provides a molten salt nuclear reactor that comprises: a vessel; a neutron moderator core; and a molten fuel salt including fertile and fissile elements. The neutron moderator core has; an inner portion and an outer portion. The outer portion surrounds the inner portion. The inner portion defines inner portion channels having a first diameter, the inner portion channels are spaced apart by a first pitch. The outer portion defines outer portion channels having a second diameter, the outer portion channels are spaced apart by a second pitch. The second diameter is smaller than the first diameter and, the second pitch is smaller than the first pitch. The inner portion channels are in fluid communication with the outer portion channels and with the vessel. The molten salt nuclear reactor is configured for circulation of the molten fuel salt within the vessel and through the inner portion channels and the outer portion channels of the neutron moderator core. The molten fuel salt has a fissile material concentration. The first diameter and the first pitch of the inner portion channels are sized as a function of the fissile material concentration to achieve a neutron multiplication factor equal or greater than one the inner portion. The second diameter and the second pitch of the outer portion channels being are sized as a function of the fissile material concentration to achieve a neutron multiplication factor of less than one in the outer portion.

In a second aspect, the present disclosure provides a molten salt nuclear reactor that comprises: a vessel; and a neutron moderator core. The neutron moderator core has an inner portion and an outer portion. The outer portion surrounds the inner portion. The inner portion defines inner portion channels having a first diameter. The inner portion channels are spaced apart by a first pitch. The outer portion defines outer portion channels that have a second diameter. The outer portion channels are spaced apart by a second pitch. The second diameter is smaller than the first diameter and, the second pitch is smaller than the first pitch. The inner portion channels are in fluid communication with the outer portion channels and with the vessel. The molten salt nuclear reactor is configured for circulation of a predetermined molten fuel salt within the vessel and through the inner portion channels and the outer portion channels of the neutron moderator core. The predetermined molten fuel salt has a preset fissile material concentration. The first diameter and the first pitch of the inner portion channels are sized as a function of the preset fissile material concentration to achieve a neutron multiplication factor equal or greater than one in the inner portion. The second diameter and the second pitch of the outer portion channels are sized as a function of the preset fissile material concentration to achieve a neutron multiplication factor of less than one in the inner portion.

BRIEF DESCRIPTION OF THE DRAWINGS

Embodiments of the present disclosure will now be described, by way of examples only, with reference to the attached figures.

DETAILED DESCRIPTION

The present disclosure relates to a nuclear core design that has an outer zone (or blanket zone) configured to decrease neutron leakage and increase productive neutron absorption in the fertile isotopes of the nuclear fuel.

At the heart of the disclosure is a novel use of nuclear core heterogenic effects where the nuclear fuel and the neutron moderator material do not form a homogeneous mixture. In the context of the present disclosure, heterogeneity refers to the ability to lower resonant band absorptions in fertile material (e.g. $^{238}$U) by the discrete arrangement of fuel and moderator (neutron moderator material) and result in the substantial lowering of needed enrichment of fuel.

Figure 1:
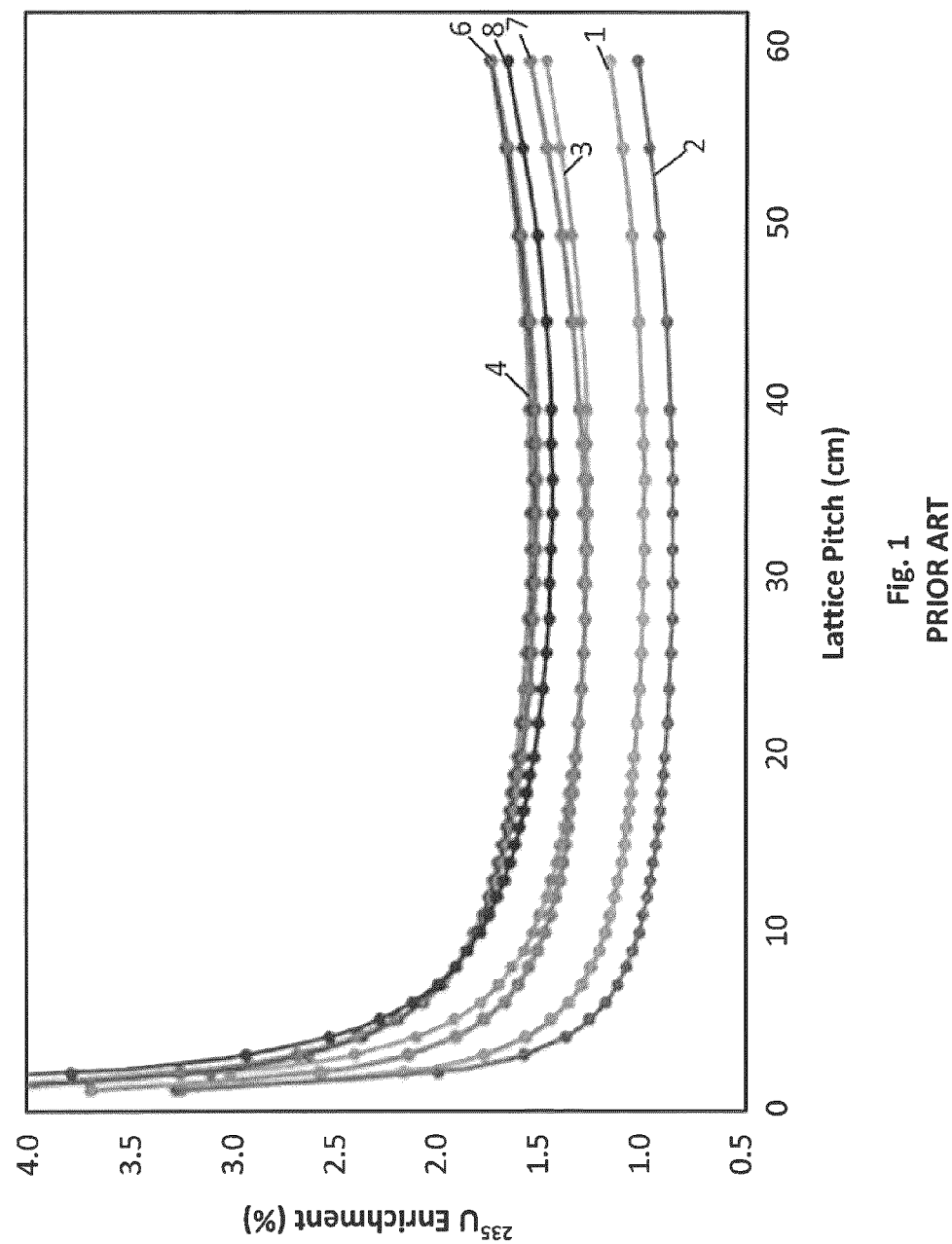
FIG. 1 shows a graph of modeled $^{235}$U enrichment required for different salts in a graphite core.

FIG. 1 shows a graph of modeled $^{235}$U enrichment at a constant salt fraction, as a function of lattice pitch. A constant salt fraction means that for all pitches between the channels (distances between channels) represented in FIG. 1, the ratio of the volume of salt in the channels to the volume of moderator material is constant. The skilled worker will understand this to mean that channels spaced apart by greater pitches will have greater diameters. The modeling on which the plots of FIG. 1 are based assumes infinite hexagonal lattices of cylindrical fuel channels in graphite and a linear relation between the radius of the channels and the pitch between the channels.

Plots relating to 8 different salt compositions are shown in the graph of FIG. 1. The plots are provided courtesy of Prof. Ondrej Chvala from The University of Tennessee Knoxville. For each of the salt compositions, there is a portion of $UF_4$. The Uranium present in the $UF_4$ contains both $^{235}$U (fissile) and $^{238}$U (fertile). It is the concentration of 235U with respect to the total amount of U that is represented in FIG. 1.

As evidenced by these plots, there is a substantial lowering of needed enrichment for various molten salts when the distance between fuel salt channels (pitch) is increased with the diameter of the channels also increasing to maintain a constant fuel fraction in this graph. The results shown at FIG. 1 are for graphite moderation typical in molten salt designs. Each data point shows the $^{235}$U enrichment required, for a specific salt, at a specific lattice pitch to have $k_{inf}$=1. $K_{inf}$ is the neutron multiplication factor for the modeled core. For cores in general, the neutron multiplication (k) is the average number of neutrons from one fission that causes another fission. The remaining neutrons either are absorber in non-fission reactions or leave the system without being absorbed.

The plots in FIG. 1, relate to the salts listed in Table 1.

TABLE 1

| Plot No. | Salt |
|---|---|
| 1 | 72% Li$^7$F—16% BeF$_2$—12% UF$_4$ |
| 2 | 73% Li$^7$F—27% UF$_4$ |
| 3 | 78% NaF—22% UF$_4$ |
| 4 | 49% NaF—38% ZrF$_4$—13% UF$_4$ |
| 5 | 58% NaF—30% BeF$_2$—12% UF$_4$ |
| 6 | 74% NaF—12% BeF$_2$—14% UF$_4$ |
| 7 | 46% NaF—33% RbF—21% UF$_4$ |
| 8 | 50.5% NaF—21.5% KF—28% UF$_4$ |

The present disclosure makes use of the heterogenic effect in a molten salt nuclear reactor that has a vessel in which a neutron moderator is placed. The neutron moderator has channels defined therein. The vessel and the neutron moderator are arranged to have a molten salt circulate through the channels. In a molten salt nuclear reactor in accordance with the present disclosure, a central core zone (seed zone) is arranged to take advantage of the heterogenic effect. For example, in the case of graphite moderator, the graphite moderator can have a central seed zone in which fuel channels are spaced apart by, for example, 5 to 10 cm or more. As shown in FIG. 1, this substantially lowers the enrichment needed to have a local reactivity or $k_{inf}$ greater than 1.0. In accordance with the present disclosure, the central zone (inner portion) is surrounded by blanket zone (outer portion) and the blanket zone defines channels that have a diameter and pitch lower than the channels in the central core zone. The pitch of the channels in the blanket zone, for a graphite moderator can be, for example, 5 cm or less. Thus in this outer blanket even with the same volume ratio of fuel to moderator (moderator material) as in the central core zone, the loss of the heterogenic effect means that this outer blanket zone will have a $k_{inf}$ much less than 1.0 and will promote the productive absorption of neutrons by fertile material present in the salt and reduce unproductive neutron loss from leakage.

Thus, this serves the same function as under-moderated blanket but does so without the drawback of needing higher fuel fractions in the outer blanket. The present disclosure can thus be said to relate to an under-heterogenic blanket (effectively homogenous blanket). In fact, the effects on lowering $k_{inf}$ with reduced heterogeneity are so strong that, even with a reduced volume ratio of fuel to moderator in the under-heterogenic zone, the blanket zone can still function as an effective absorber of leakage neutrons.

Figure 2:
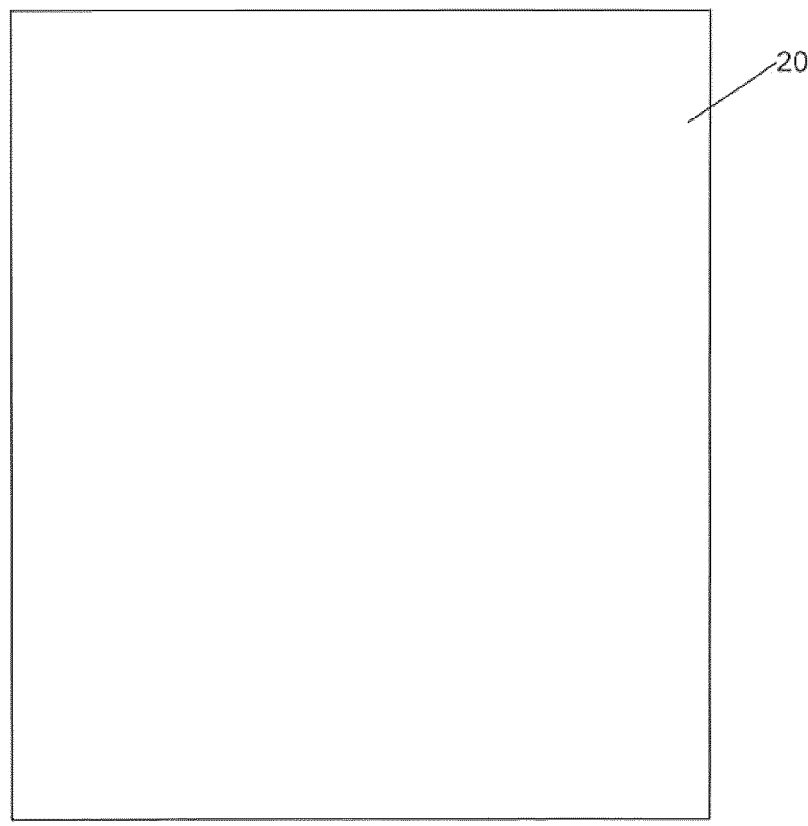
FIG. 2 shows a side elevation view of an embodiment of a nuclear reactor core in accordance with the present disclosure.
Figure 3:
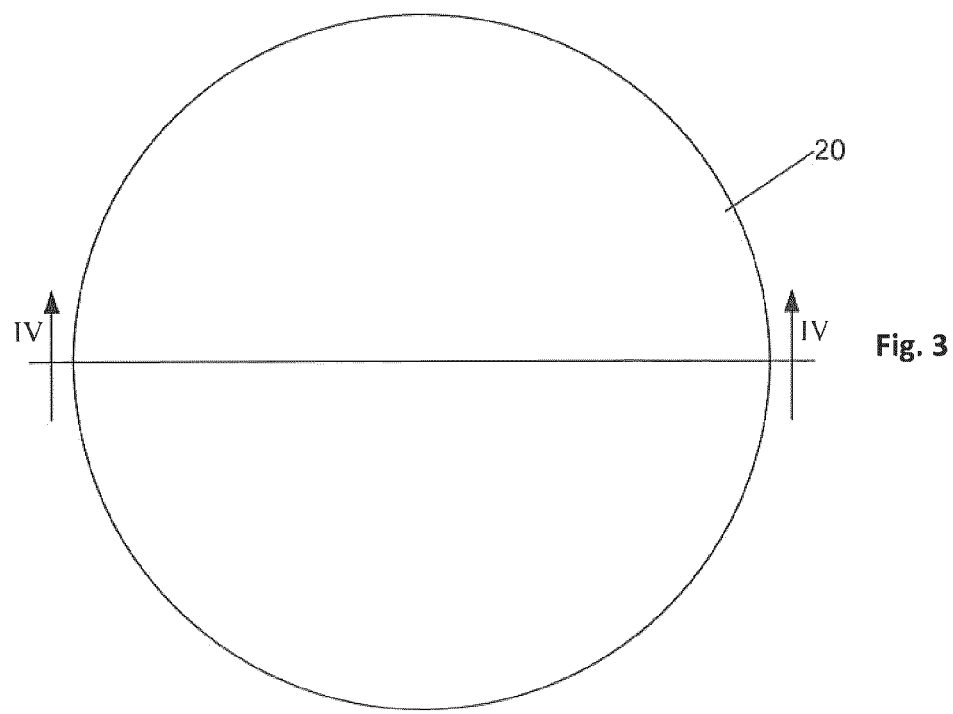
FIG. 3 shows a top view of the nuclear reactor core of FIG. 2.

FIG. 2 shows a side elevation view of an embodiment of a nuclear reactor core 20 in accordance with the present disclosure. FIG. 3 is a top view of the nuclear reactor core 20.

Figure 4:
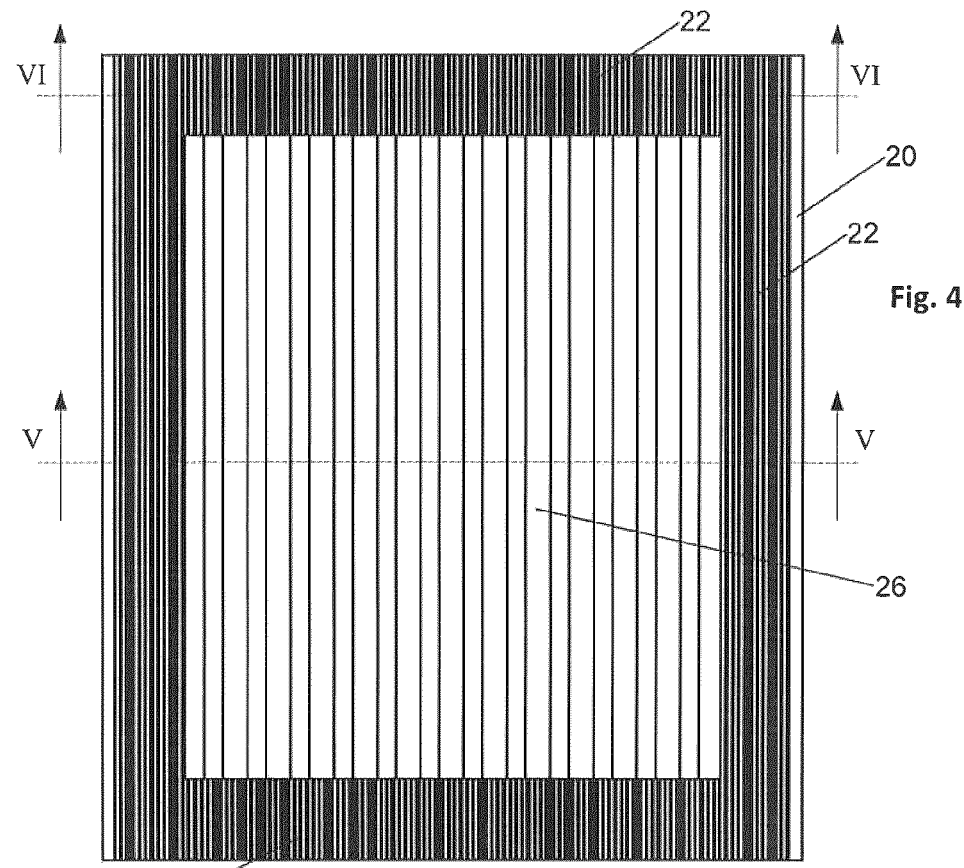
FIG. 4 shows an elevation cross-sectional view of the nuclear reactor core of FIG. 2.
Figure 5:
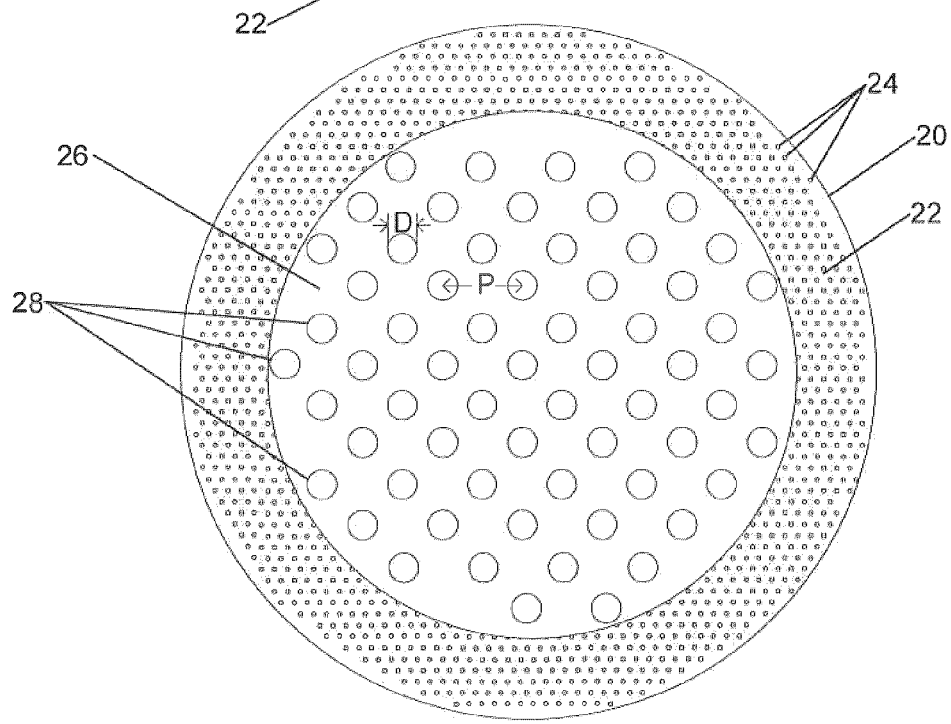
FIG. 5 shows a diameter cross-sectional view of the nuclear reactor core of FIG. 2.
Figure 6:
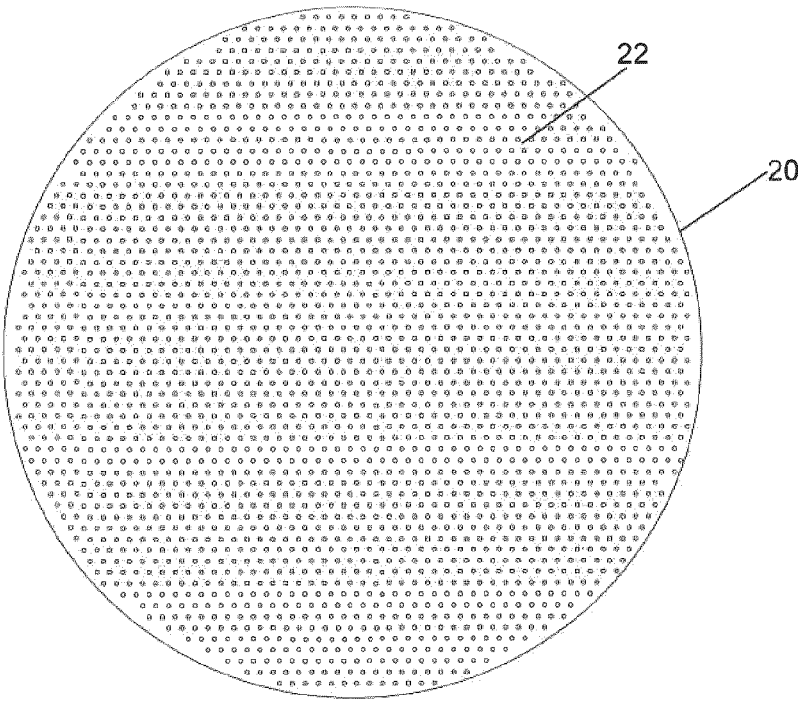
FIG. 6 shows another diameter cross-sectional view of the nuclear reactor core of FIG. 2.

FIG. 4 is a cross-sectional view of the reactor core taken along the line IV-IV of FIG. 3. FIG. 5 is a cross-sectional view of the reactor core taken along the line V-V of FIG. 4. FIG. 6 is a cross-sectional view of the reactor core taken along the line VI-VI of FIG. 4.

Figure 7:
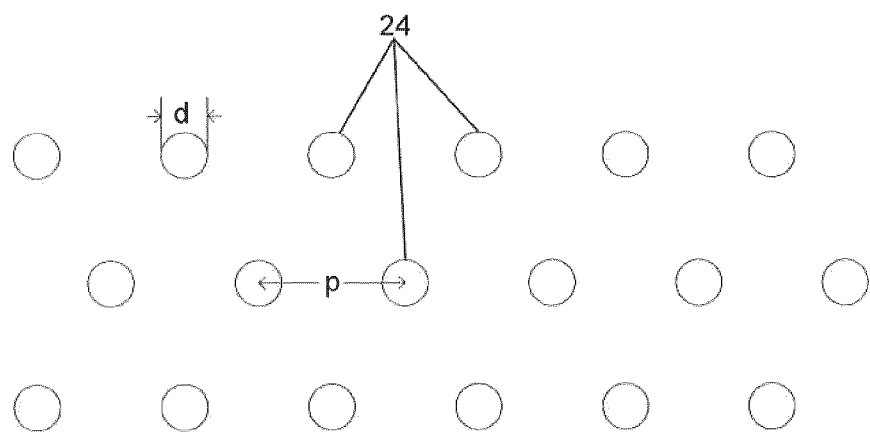
FIG. 7 shows a close-up view of outer region channels of the nuclear reactor core of FIG. 2.

FIGS. 4 and 5 show an outer region 22 of the reactor core 20. The outer portion 22 defines a series of outer region channels 24 (shown at FIG. 5) having an outer portion channel diameter 'd'; the outer portion channels 24 are spaced-apart by an outer portion channel pitch 'p'. FIG. 7 shows a close-up view of outer portion channels 24. FIG. 7 also shows the outer portion channel diameter 'd' and the outer portion channel pitch 'p' are FIGS. 4 and 5 further show an inner region 26 of the reactor core 20. The inner region 26 defines a series of inner region channels 28 having an inner region channel diameter 'D'; the inner region channels are spaced-apart by an inner region pitch 'P'.

As exemplary numbers, for a reactor core having a diameter of 3.4 m and a height of 4 m, the outer portion pitch 'p' can be equal to 2.5 cm, the inner portion pitch 'P' can be equal to 25 cm, the outer portion diameter 'd' can be equal to 0.9 cm and the inner portion diameter 'D' can be equal to 9 cm. Even though the present example is for a reactor core having a diameter of 3.4 m and a height of 4 m, reactor cores of any suitable dimensions are to be considered within the scope of the present disclosure. For example, reactor cores having a height of 30 cm or more and a diameter of 30 cm or more are to be considered within the scope of the present disclosure.

Further, even though, in the present example, the ratio of the diameter 'd' to the pitch 'p' is equal to the ratio of the diameter 'D' to the pitch 'P', this need not be the case. That is, the ratio of the diameter to the pitch of the channels in the inner portion of the core can be less than, equal to, or greater than the ratio of pitch to diameter of the channels in the outer portion without departing from the scope of the present disclosure.

Furthermore, even though, in the present example, ratio of the volume of salt to moderator material in the inner portion is equal to the ratio of volume of salt to moderator material in the outer portion, this need not be the case. The ratio in question in the inner portion can be higher, lower or the same as the ratio in the outer portion without departing from the scope of the present disclosure. The volume of salt in the inner portion is equal to the volume of the inner portion channels. The volume of salt in the outer portion is equal to the volume of the outer portion channels.

As indication of a similar exemplary case, modeling has been performed for a molten salt system with graphite moderator using Serpent neutronic modeling software. Four cases have been run. All cores modeled have had a fixed diameter of 3.4 m and a height of 4 m, graphite as moderator and fuel salt consisting of 72% $^7$LiF-16% $BeF_2$-12$UF_4$. Any neutrons leaving the core are counted as leakage neutrons.

In the first case, as a reference, a single zone system, referred to as a bare core, has a hexagonal lattice pitch of 15 cm and a channel diameter of 5.4 cm, which gives a fuel salt fraction of 11.75%. Total fuel salt volume is 4.27 cubic meters and enrichment of the uranium is 1.41% U235. In this case neutron leakage was equal to 10.6% of all neutrons.

In the second case, the traditional method of employing larger channel diameters in an outer radial and axial zone was modeled. In this two zone system, an outer zone was located in the outer radial 45 cm, and at top and bottom axial 45 cm. This outer zone had a channel diameter of 9 cm to give a salt fraction in the outer 45 cm zone of 32.6% salt fraction. Enrichment is slightly higher at 1.56% U235. As would be expected, this undermoderated outer zone is quite effective in reducing neutron leakage as it dropped neutron leakage down to 6.46%. This, however, coming at the expense of more than double the needed fuel salt in the overall core of 8.67 cubic meters.

In the third case, and in accordance with the present disclosure, a similar 45 cm outer radial and axial zone was employed. This outer zone has the same 11.75% salt fraction as the inner zone but, has a pitch of 2.5 cm and a fuel salt channel diameter of 0.9 cm. Neutron leakage is substantially reduced from the first bare core case to 8.59%. Not quite as substantial a drop as the undermoderated case but without a penalty of increased fuel salt need as it contains the same 4.27 cubic meters of salt as the bare core reference case. This result validates the value of the present disclosure.

In a fourth case, a combination of the two cases of traditional undermoderated and the presently disclosed under heterogenic case was modeled. In this modeling, the outer 45 cm zone had a small 2.5 cm pitch but a larger 1.5 cm fuel channel size. It thus has the same total fuel salt of 8.67 cubic meters of undermoderated case but now the neutron leakage is significantly improved to only 4.63%, less than half the neutron leakage of the bare core case.

Table 2 shows the parameters of four cases above.

In the examples provided, the pitch is a hexagonal lattice pitch. However, this need not be the case. Moderator cores having any suitable type of pitch are to be considered within the scope of the present disclosure. For example, a square lattice pitch is within the scope of the present disclosure.

TABLE 2

| | Bare reactor | Two zones inner | Two zones outer | Two zones inner | Two zones outer | Two zones Inner | Two zones outer |
|---|---|---|---|---|---|---|---|
| Channel Diameter (cm) | 5.4 | 5.4 | 9 | 5.4 | 0.9 | 5.4 | 1.5 |
| Pitch (cm) | 15 | 15 | 15 | 15 | 2.5 | 15 | 2.5 |
| Fuel Salt Fraction (% volume) | 11.75 | 11.75 | 32.6 | 11.75 | 11.75 | 11.75 | 32.6 |
| Fuel Volume (m³) | 4.27 | 8.67 | | 4.27 | | 8.67 | |
| Neutron Leakage (%) | 10.6 | 6.46 | | 8.59 | | 4.63 | |

Figure 8:
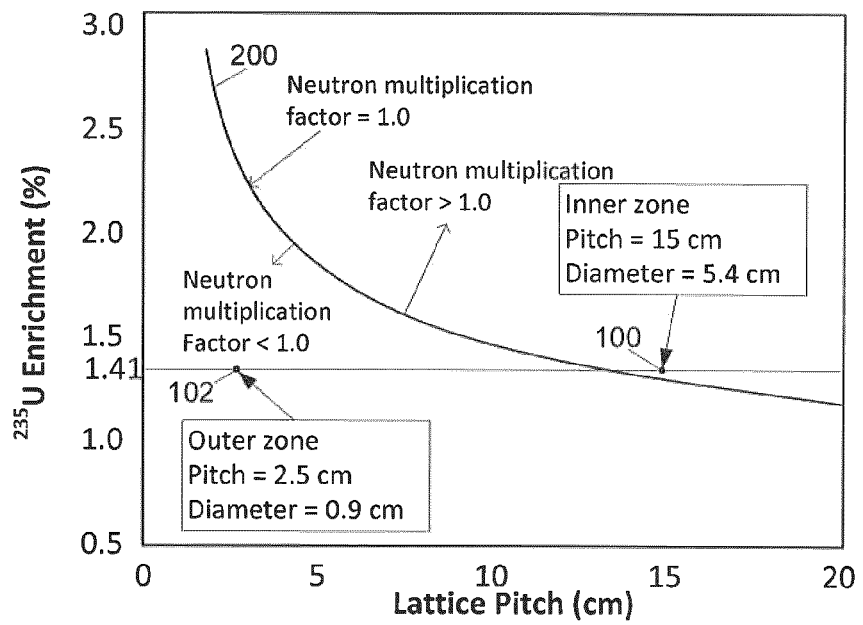
FIG. 8 shows a plot of 235U enrichment as a function of lattice pitch for an example of a nuclear reactor core in accordance with the present disclosure.

FIG. 8 relates to the third case discussed above where the graphite moderator core has a diameter of 3.4 m and a height of 4 m and the fuel salt is 72% $^7$LiF-16% BeF$_2$-12% UF$_4$. The graphite moderator core has a 45 cm outer portion radial and an inner portion. This outer portion has the same 11.75% salt fraction as the inner portion but, has a pitch of 2.5 cm and a fuel salt channel diameter of 0.9 cm. FIG. 8 shows a data point 100 (pitch=15 cm, diameter=5.4 cm) in the inner zone of the graphite moderator core, which is above the plot 200 of required enrichment as a function of lattice pitch, to a point 102 (pitch=2.5 cm, diameter=0.9 cm) in the outer zone, which is below the plot 300 in question.

The reactor in accordance with the present disclosure can operate on the salts listed in Table 1. As will be understood by the skilled worker, the reactor can also function on salts having a composition different than those listed in Table 1. That is, the relative amount of each compound in a given salt can be varied in any suitable way and still be suitable for operation of the molten salt nuclear reactor of the present disclosure.

The salts listed in Table 1 all use $^{235}$U as fissile material. However, this need not be the case. Other fissile materials can be used without departing from the scope of the present disclosure. For example, $^{233}$U and Plutonium (e.g., $^{239}$Pu, $^{241}$Pu). Also, the salts listed in Table 1 all include $^{238}$U as a fertile material. As will be understood by the skilled worker, other fertile elements can be used without departing from the scope of the present disclosure. For example, $^{232}$Th, $^{238}$Pu, $^{240}$Pu, $^{242}$Pu can be used as fertile elements. Examples of compounds that can be used in a molten salt for the reactor of the present disclosure include, ($^{235}$U+$^{238}$U+$^{232}$Th)F$_4$, ($^{235}$U+$^{238}$U+$^{233}$U+$^{232}$Th)F$_4$, ($^{233}$U+$^{232}$Th)F$_4$, PuF$_3$+ThF$_4$.

Further, even though the salts listed in Table 1 all include 2 or 3 compounds, this need not be the case. Salts having any suitable number of compounds (salt compounds) are to be considered within the scope of the present disclosure. Further, any suitable salt compound can be used without departing from the scope of the present disclosure. As will be understood by the skilled worker, the selection of the compounds, including then number of compounds and the selection of the fertile and fissile elements in the salt on which the reactor of the present disclosure operates is based, among other factors, on the melting point of the salt and the neutron cross section of the fissile and fertile elements present in the salts. The worker skilled in the art can readily deal with these factors.

The molten salt nuclear reactor of the present disclosure can function on a molten salt having any suitable ratio of fissile material to fertile material. For example, the molten salt nuclear reactor of the present disclosure can function on any suitable molten salt having a ratio of fissile material to fertile material of 0.007 or more.

As will be understood by the skilled worker, when the molten salt and the concentration of fissile material in the salt are known (predetermined, preset) it is possible to calculate the required size of the diameter and the pitch of the inner portion channels in order to achieve a neutron multiplication factor equal or greater than one in the inner portion. Similarly, it is possible to calculate the required size of the diameter and the pitch of the outer portion channels in order to achieve a neutron multiplication factor of less than one in the outer portion.

Figure 9:
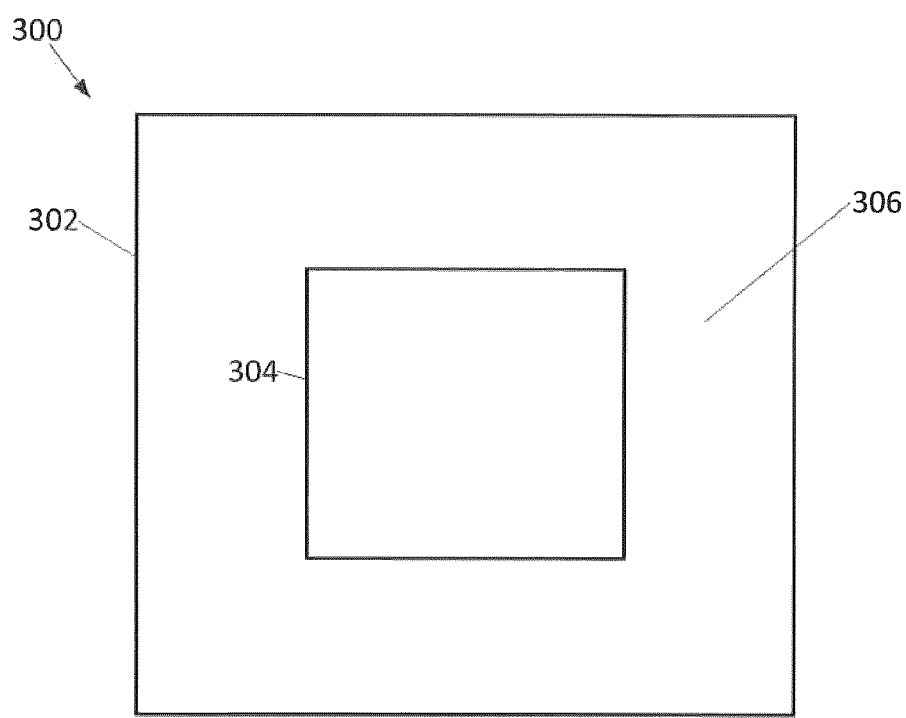
FIG. 9 shows a block diagram of a molten salt nuclear reactor in accordance with the present disclosure.

FIG. 9 shows a block diagram of a molten salt nuclear reactor 300 in accordance with the present disclosure. The molten salt nuclear reactor 300 includes a vessel 302, a neutron moderator core 304 and a molten salt 306, which includes fertile and fissile elements. The molten salt nuclear reactor 300 is configured for circulation of the molten salt 306 within the vessel and through channels of the neutron moderator core 304 (the channels include inner portion channels and outer portion channels described above). For example, the molten salt nuclear reactor 300 can be equipped with a pump system (not shown) that circulates the molten salt 306 within the vessel and through channels of the neutron moderator core 304.

The present disclosure is also of potential benefit to reactors of various fuel (solid, liquid or gaseous forms) and various moderators (graphite, light water, heavy water, beryllium, beryllium oxide, zirconium hydride, zirconium deuteride, etc.).

The present disclosure provides a nuclear core design that allows for a reduction of neutron leakage and protection of surrounding material such as reactor vessel walls. The present disclosure also improves the fuel economy of the reactor without requiring the excessive volumes of fuel required for the prior art of the undermoderated blanket concept.

In the preceding description, for purposes of explanation, numerous details are set forth in order to provide a thorough understanding of the embodiments. However, it will be apparent to one skilled in the art that these specific details are not required.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

The invention claimed is:

1. A molten salt nuclear reactor comprising:
    a vessel;
    a neutron moderator core located in the vessel; and
    a molten fuel salt including fertile elements and fissile elements, the fissile elements being associated to a fissile elements concentration of the molten fuel salt, the neutron moderator core having:
        an inner portion and an outer portion, the outer portion surrounding the inner portion,
            the inner portion defining inner portion channels extending through the neutron moderator core and having a first diameter, the inner portion channels being spaced apart by a first pitch, a ratio of a volume of the inner portion channels to a volume of the moderator material in the inner portion being a first ratio,
            the outer portion defining outer portion channels extending through the neutron moderator core and having a second diameter, the second diameter being smaller than the first diameter, the outer portion channels being spaced apart by a second pitch, the second diameter being smaller than the first diameter, the second pitch being smaller than the first pitch, a ratio of a volume of the outer portion channels to a volume of the moderator material in the outer portion being a second ratio, the second ratio being equal to or greater than the first ratio, the inner portion channels being in fluid communication with the outer portion channels and with the vessel, the molten salt nuclear reactor is configured for circulation of the molten fuel salt within the vessel and through the inner portion channels and the outer portion channels of the neutron moderator core during operation of the molten salt nuclear reactor, the first diameter of the inner portion channels and the first pitch of the inner portion channels being based at least on the fissile elements concentration of the molten fuel salt and on a target inner portion neutron multiplication factor that is equal to one or is greater than one, an operational neutron multiplication factor of the inner portion being equal to one or being greater than one during the operation of the molten salt nuclear reactor, the second diameter of the outer portion channels and the second pitch of the outer portion channels being based at least on the fissile elements concentration of the molten fuel salt and on a target outer portion neutron multiplication factor that is less than one, an operational neutron multiplication factor of the outer portion being less than one during the operation of the molten salt nuclear reactor.

2. The reactor of claim 1 wherein a ratio of the first channel diameter to the first pitch is equal to a ratio of the second channel diameter to the second pitch.

3. The reactor of claim 1 wherein a ratio of the first channel diameter to the first pitch is less than a ratio of the second channel diameter to the second pitch.

4. The reactor of claim 1 wherein the neutron moderator core is cylindrically shaped.

5. The reactor of claim 4 wherein the neutron moderator has a height greater than 30 cm and a diameter larger than 30 cm.

6. The reactor of claim 1 wherein the first pitch is a first hexagonal pitch and the second pitch is a second hexagonal pitch.

7. The reactor of claim 1 wherein the fuel salt is selected from a group consisting of:

72% $Li^7F$-16% $BeF_2$-12% $UF_4$, 73% $Li^7F$-27% $UF_4$, 78% NaF-22% $UF_4$, 49% NaF-38% $ZrF_4$-13% $UF_4$, 58% NaF-30% BeF2-12% $UF_4$, 74% NaF-12% BeF2-14% $UF_4$, 46% NaF-33% RbF-21% $UF_4$, and 50.5% NaF-21.5% KF-28% $UF_4$.

8. The reactor of claim 1 wherein the molten fuel salt has a ratio of fissile material to fertile material greater than 0.007.

9. The reactor of claim 1 wherein the fissile materials include at least one of $^{233}U$, $^{235}U$, $^{239}Pu$ and $^{241}Pu$.

10. The reactor of claim 1 wherein the fertile materials include at least one of $^{232}Th$, $^{238}Pu$, $^{240}Pu$ and $^{242}PU$.

11. The reactor of claim 1 wherein the neutron moderator core is made of a material that includes at least one of graphite, beryllium, zirconium hydride and beryllium oxide.

* * * * *